United States Patent
Ristolainen et al.

(10) Patent No.: US 8,816,105 B2
(45) Date of Patent: Aug. 26, 2014

(54) METHOD AND APPARATUS FOR PURIFYING CRUDE TALL OIL

(75) Inventors: Matti Ristolainen, Lappeenranta (FI); Jaakko Nousiainen, Lappeenranta (FI)

(73) Assignee: UPM-Kymmene Corporation, Helsinki (FI)

( * ) Notice: Subject to any disclaimer, the term of this patent is extended or adjusted under 35 U.S.C. 154(b) by 520 days.

(21) Appl. No.: 13/022,358

(22) Filed: Feb. 7, 2011

(65) Prior Publication Data

US 2011/0213169 A1    Sep. 1, 2011

(30) Foreign Application Priority Data

Feb. 8, 2010   (FI) .................................. 20105121

(51) Int. Cl.
| | | |
|---|---|---|
| C11B 1/00 | (2006.01) | |
| C11B 3/16 | (2006.01) | |
| C11B 3/00 | (2006.01) | |
| B01D 21/30 | (2006.01) | |

(52) U.S. Cl.
CPC . C11B 3/008 (2013.01); C11B 3/16 (2013.01); B01D 21/305 (2013.01)
USPC .......................................................... 554/8

(58) Field of Classification Search
USPC .......................................................... 554/8
See application file for complete search history.

(56) References Cited

U.S. PATENT DOCUMENTS

| 2,358,004 A | 9/1944 | Dressler et al. |
|---|---|---|
| 4,532,034 A | 7/1985 | Hans et al. |
| 2006/0264684 A1 | 11/2006 | Petri et al. |

FOREIGN PATENT DOCUMENTS

| CN | 101445742 A | 6/2009 | |
|---|---|---|---|
| EP | 1741768 A1 | 1/2007 | |
| FI | 20095198 A | 8/2010 | |
| WF | WO 2009/039000 A2 | 3/2009 | |
| WO | WO 2008/058664 A1 | 5/2008 | |
| WO | WO 2009/131510 A1 | 10/2009 | |
| WO | WO 2009131510 A1 * | 10/2009 | ............... C11C 3/12 |
| WO | WO 2010/097519 A2 | 9/2010 | |

OTHER PUBLICATIONS

Office Action in Swedish Patent Application No. 1150085-7 dated Jun. 27, 2011.
Finnish Search Report of Finnish patent application No. 20105121 dated Sep. 16, 2010.

* cited by examiner

*Primary Examiner* — Deborah D Carr
(74) *Attorney, Agent, or Firm* — Birch, Stewart, Kolasch & Birch, LLP

(57) ABSTRACT

The present invention relates to a method and apparatus for purifying crude tall oil. The purification method comprises a first purification step (2) for separating at least solids (8) from the crude tall oil and producing solids free crude tall oil, and after the first purification step (2) a second purification step (4) for separating water (14) from the solids free crude tall oil. The purification apparatus comprises at least one solids separator (3, 5') for separating at least solids (8) from the crude tall oil and producing solids free crude tall oil, and at least one water separator (5, 9) arranged downstream of the solids separator (3, 5') in the flow direction of the crude tall oil for separating at least water (14) from the solids free crude tall oil.

16 Claims, 5 Drawing Sheets

METHOD AND APPARATUS FOR PURIFYING CRUDE TALL OIL

FIELD OF THE INVENTION

The present invention relates to purifying crude tall oil and particularly to a method for purifying crude tall oil, characterized in that the purifying comprises a first purification step (2) for separating at least solids (8) from the crude tall oil and producing solids free crude tall oil, and after the first purification step (2) a second purification step (4) for separating water (14) from the solids free crude tall oil by phase separation. The present invention further relates to an apparatus for purifying crude tall oil, characterized in that the apparatus comprises at least one solids separator (3, 5') for separating at least solids (8) from the crude tall oil and producing solids free crude tall oil, and at least one water separator (5, 9) arranged downstream of the solids separator (3, 5') in the flow direction of the crude tall oil for separating at least water (14) from the solids free crude tall oil by phase separation.

BACKGROUND OF THE INVENTION

Tall oil is a by-product of kraft pulping of coniferous trees. It comprises resins acids, fatty acids and unsaponifiables. Tall oil is recovered from black liquor that is formed as a result of pulping coniferous trees in alkaline cooking liquor form black liquor. The black liquor contains cooking chemicals, lignin and other substances separated from the wood. The black liquor is then concentrated and left to settle. Tall oil soap rises on the surface of the black liquor and can be separated from it. The soap is acidulated by adding acid, such as sulphuric acid to the soap and crude tall oil is produced. The crude tall oil (CTO) may further be distilled for producing distilled tall oil (DTO).

CTO can be used for different purposes, for example for preparing soap, pine soap, cosmetic products or carbonaceous fuel components. The carbonaceous fuel components are produced by catalytic hydrodeoxygenation (HDO) and/or hydroisomerization (HI) of CTO, as is described for example in document WO2008/058684. One problem when using CTO as feedstock for fuel components is that metals in the CTO tend to deactivate the catalysts used in these catalytic processes. The metals in the CTO poison the catalysts active sites thus preventing the catalysts from functioning properly, Furthermore, the lignin residues in the CTO clogs the pores of the catalyst also deactivating the catalyst. Consequently, when preparing fuel components from CTO, it is purified before the HDO and/or HI steps to remove impurities, such as metals, residue lignin and/or carbohydrate derived material and possible other substances.

Document WO2008/058664 describes a process in which feedstock, vegetable oil or animal oil, is treated before HDO step to remove alkaline metals and alkaline earth metals from the feedstock. This treatment is conducted by washing the feedstock with slightly acidic media or absorbing the metals on a suitable material, for example using ion exchange resins.

Document EP 1741768 describes a process in which the feedstock, bio oil or fat, is degummed before HDO step. In degumming phosphorous compounds are removed from the feedstock and it is performed by washing the feedstock with $H_3PO_4$, NaOH and soft water and separating the formed gums. Most of the metal components in the feedstock are removed during degumming.

After the metal components removal, lignin and possible other residues are separated from the feedstock by e.g. decanting.

One of the problems associated with the prior art vegetable oil based feedstock purification methods is that they are slow and inefficient thus making them difficult to be used in processes for producing biofuels. If the feedstock is CTO, it comprises metals such as copper, iron, sodium, phosphorus, silicon and also some aluminium, calcium, potassium and lead. Washing based methods for removing metals do not decrease the metal content of the feedstock sufficiently to prevent deactivation of the catalytic agent used in the HDO and HI steps. Furthermore a considerable amount of feedstock, CTO, is lost together with the separated lignin when decanting the feedstock for lignin and possible other residues. This decreases the yield of the process such that less biofuel is obtained from a specific volume of feedstock.

BRIEF DISCLOSURE OF THE INVENTION

An object of the present invention is to provide a method and an apparatus so as to overcome the above prior art problems. The objects of the invention are achieved by a method for purifying crude tall oil, which method is characterized in that purifying comprises a first purification step for separating at least solids from the crude tall oil and producing solids free crude tall oil, and after the first purification step a second purification step for separating water from the solids free crude tall oil by phase separation. The objects of the invention are further achieved by an apparatus comprising at least one solids separator for separating at least solids from the crude tall oil and producing solids free crude tall oil, and at least one water separator arranged downstream of the solids separator in the flow direction of the crude tall oil for separating at least water from the solids free crude tall oil by phase separation.

The preferred embodiments of the invention are disclosed in the dependent claims.

The invention is based on the idea of purifying crude tall oil in at least in two consecutive steps such that first the crude tall oil is subjected to a purification treatment where mostly solids are separated from the CTO and after that to a purification treatment where essentially water is separated from the solids free CTO by phase separation. In the first purification step the crude tall oil is filtered or subjected to phase separation in which most of the solids are removed from the crude tall oil. In the second purification step the crude tall oil is subjected to phase separation in which water is removed from the crude tall oil. The phase separation in the second purification step may comprise, for example, decantation, centrifugation, a liquid coalescing process or any combination thereof for removing water from the crude tall oil.

An advantage of the present invention is that it provides an efficient and fast solution for removing unwanted metals and residue lignin from the CTO. In the present invention the residue lignin precipitates together with the metals in the CTO. The precipitation may be further enhanced by adjusting the pH-value of the CTO, preferably it is set between 0.6 and 6. The precipitated lignin and metals are separated together from the CTO and thus the quality of the CTO is improved and the yield of the CTO process for producing biofuel components increases. After the most solids have been separated from the CTO, it is further subjected to water removal step in which essentially water and possible residue metals and metals dissolved into the water are removed. The purification method of the present invention is fast and provides an efficient solution for purification of tall oil to be used efficiently in the process for preparing fuel components from CTO. This means, that the catalysts will not be poisoned or clogged by the impurities and the lifetime of the catalysts used in fuel manufacturing processes is much longer than before when prior art purification methods of the feedstock have been used.

BRIEF DESCRIPTION OF THE DRAWINGS

In the following the invention will be described in greater detail by means of preferred embodiments with reference to the attached drawings in which.

DEFINITIONS

In the present description and claims, the following terms have the meanings defined below.

The term "CTO" or "crude tall oil" refers to a by-product of the Kraft process of wood pulp manufacture. CTO contains generally both saturated and unsaturated oxygen-containing organic compounds such as rosins, unsaponifiables, sterols, resin acids, fatty acids, fatty alcohols and other alkyl hydrocarbon derivatives as well as inorganic impurities. CTO also contains lignin, metals and small particles such as fibers and fines.

The term "solids free CTO" refers to crude tall oil that has been purified in the first purification step. Most of the solid matter and metals have been removed from it, but it may still contain minor amounts of lignin, metals and other small particles.

The term "purified CTO" refers to crude tall oil that has been purified both in a first purification step and after that in a second purification step. Lignin, solid matter, metals and water has been removed from it in such an extent that the purified CTO can be used in different end applications, for example for fuel component production.

"Phase separation" refers to a separation process that is based on gravity and different densities of the components to be separated.

DETAILED DESCRIPTION OF THE INVENTION

Figure 1:
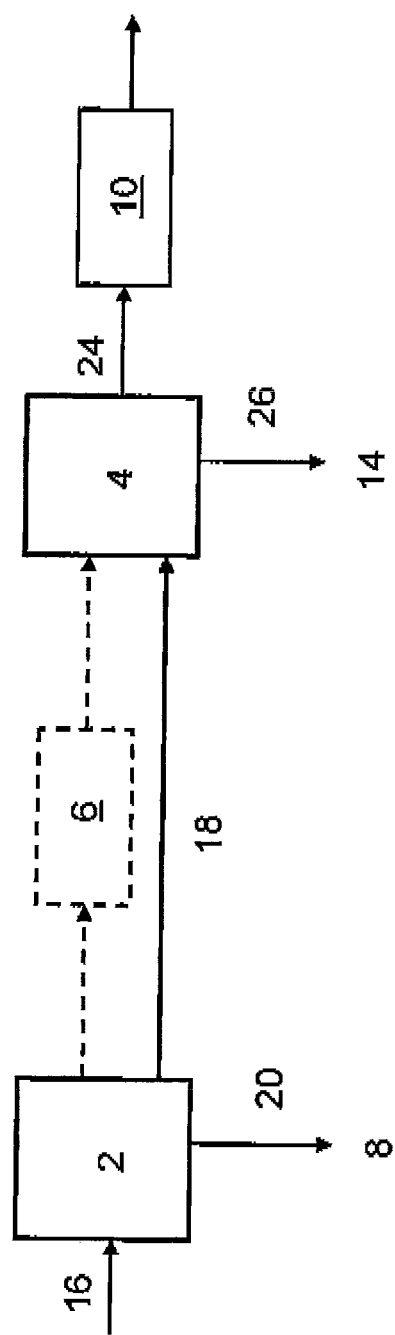
FIG. 1 is a schematic flow diagram showing the purification of CTO according to the present invention.

FIG. 1 shows a schematic flow diagram of the purification arrangement of CTO according to the present invention. In the FIGS. 1 to 5 same features are denoted with same reference numerals. The purification arrangement comprises a first purification step 2 for separating solids from the crude tall oil and after the first purification step 2 a second purification step 4 for separating water from the crude tall oil. The second purification step 4 is arranged after the first purification step 2 in the direction of the CTO flow. CTO produced by pulping of coniferous trees, is first conducted to the first purification step 2 through conduit 16. In the first purification step 2 at least solids 8 are separated by at least one solids separator from the CTO and removed from the first purification step along conduit 20. The solids free CTO from the first purification step 2 is further conducted along conduit 18 to second purification step 4, where at least one water separator separates at least water 14 from the solids free CTO. The separated water 14 is removed from the second purification step along conduit 26. Alternatively the solids free CTO may be conducted from the first purification step 2 via an intermediate storage tank 6 to second purification step 4, which is shown in FIG. 6 by dotted line. The solids separator may be a filter, two phase separator or a three phase separator or any other means capable of separating solids from CTO. The water separator may be for example a two phase separator, three phase separator, decanter apparatus, centrifuge, liquid coalescing apparatus, any combination thereof or any other means for separating water from CTO where the separation is based on gravity and different densities of the components to be separated. After the second purification step 4 the purified CTO is conducted a storage tank 10 along conduit 24. From the storage tank 10 the purified CTO may be conducted to catalytic hydrodeoxygenation (HDO) and/or hydroisomerization (HI) for preparing carbonaceous fuel components, such as biofuel.

The present invention is based on the idea using two-step purification for crude tall oil in such a way that first most of the solids are removed from the CTO and then water is removed from the CTO. The first purification step 2 may be conducted by filtering or by phase separation for separating solids from the CTO. The second purification step 4 may be conducted by phase separation, for example by decantation, centrifugation, liquid coalescing process or by any combination thereof. In the following some preferable embodiments of the apparatus of the present invention are described referring to FIGS. 2 to 5.

Figure 2:
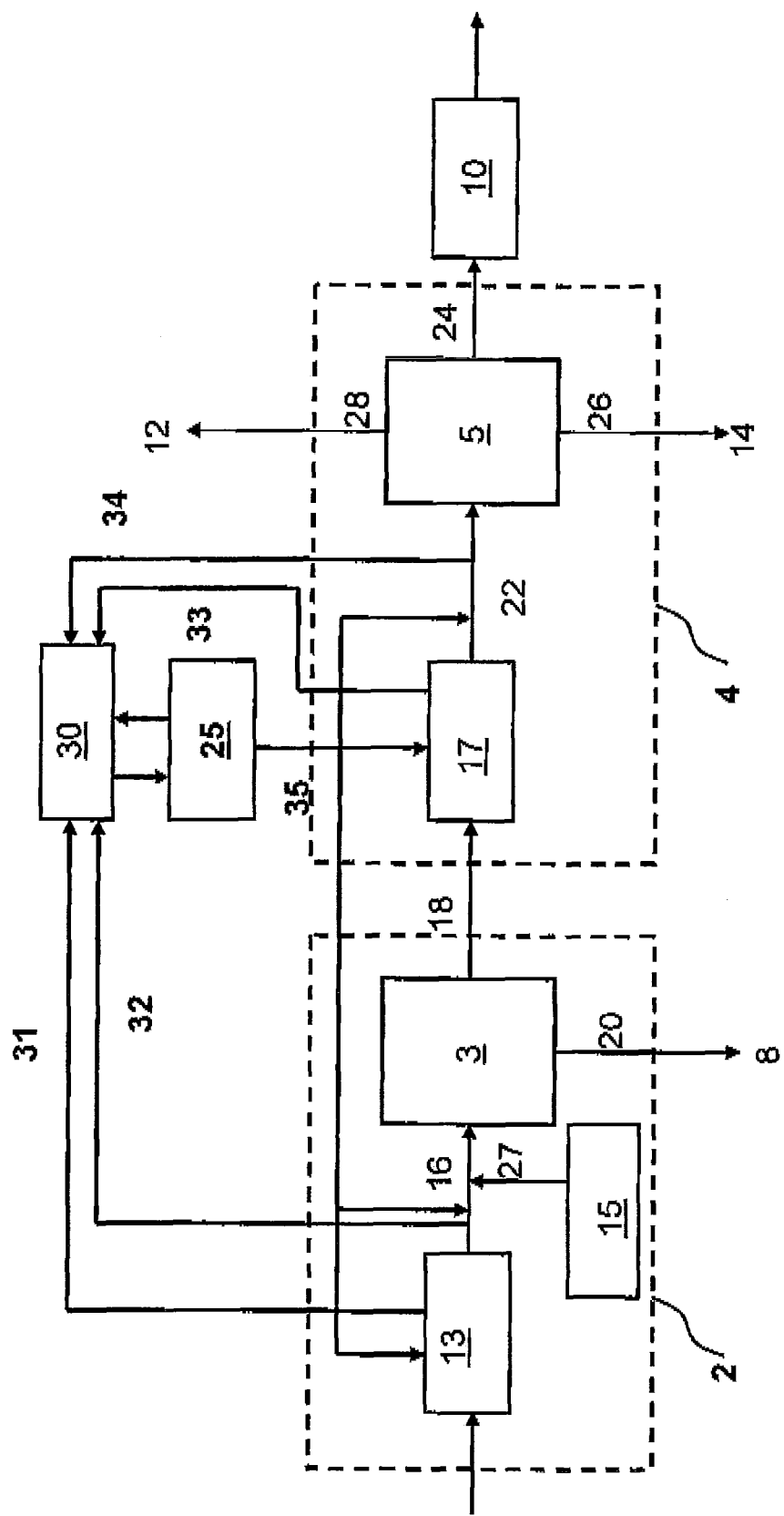
FIGS. 2 to 5 show schematic flow diagrams showing embodiments of the apparatus of the present invention.

FIG. 2 shows one embodiment of the present invention in which the first purification step 2 is carried out by filtering the CTO to remove precipitated lignin, metals and other possible solids 8. The filtering is preferably carried out by pressure filtering using one or more pressure filters 3. A pressure filter usually comprises a filter cloth or membrane through which the medium to be filtered is forced by aid of pressure. During filtering a filtering cake is formed on the filter cloth or filter membrane from the precipitated metals, lignin and possible other solid impurities. This filtering cake retains and absorbs also metals and alkali metals still remaining in the CTO. Pressure filters and the filtering process using them are well known and will thus not be discussed here in detail. The first purification step 2 therefore removes most of the solids, metals and precipitated lignin from the CTO. During filtering step the temperature of the CTO is between 20 to 120° C., preferably between 50 to 100° C., and more preferably about 90° C.

The filtering may be enhanced by adding filtration aid by filtration aid supply means 15 along conduit 27 to the CTO before the one or more filters 3. Filtration aid 15 is added to prevent solids or other precipitates in the CTO forming a sticky impermeable filter cake. The cake properties and filtering efficiency are enhanced by maintaining the permeability of the accumulating cake by using the filtration aid 15. The filtration aid 15 is removed from the CTO during the filtering in the filter 3. Cellulose, cellulose containing chemical agents, chemical pulp or combination thereof may be used as filtration aid 15. Also other suitable filtration aid material can be used. The filter cake may be periodically removed from the filter. The removed filter cake comprising lignin and possibly also fibres may be burned for producing energy.

From the first purification step 2 the solids free CTO is conducted to the second purification step 4 via conduit 18. The second purification step comprises one or more phase separators 5, in which both water 14 and remaining solids 12 are separated from the solids free CTO. As phase separators, two or three phase separators can be used. In a phase separator, the CTO separates from the water and solids thus producing purified CTO. Phase separators and their operating principles are well known and will thus not be discussed here in detail. The separated water 14 is removed from the one or more separators 5 through conduit 26 and the removed solids 12 are removed through conduit 28. The purified CTO that is conducted to the storage tank 10 through conduit 24 has therefore both solids 8, 12 and water 14 separated from it.

To enhance the separation of lignin, metals and possible other impurities which may be dissolved into the CTO, the apparatus also contains washing means for washing the CTO. Washing the crude tall oil with water is carried out before the first purification step 2. Alternatively or additionally the solids free CTO is washed with water between the first purification step 2 and the second purification step 4. Washing is carried out in the first and/or the second purification steps 2, 4, before the purification means 3 and/or 4. In the embodiment presented in FIG. 2, there is a first washer 13 before the one or more filters 3 for washing the CTO and a second washing means 17 before the one or more phase separators 5 for washing the solids free CTO. The CTO/solids free CTO is preferably washed with hot water but also cold water may be used. Washing with water may be conducted in any know method and apparatus, such as washing column. In the case where several purification means are used in a purification step, the washer may also be arranged between the different purification means in the same step.

pH-value of the CTO has an important effect on the precipitation of lignin, metals and other possible impurities in the CTO. Low pH-value of the CTO causes the residue lignin, possible residue fibres or other impurities to precipitate in the CTO. The pH-value of the CTO has to be under 7, preferably under 4 so that the precipitation of lignin, metals and possible other impurities is sufficient. In a preferred embodiment the pH-value of the CTO is between 0.5 and 6 and more preferably between 1 and 3. The pH-value of the CTO may be already in the preferred range when the CTO is conducted from the soap separation to the purification, but this is not always the case. When the pH-value of the CTO is not in the preferred range, it has to be adjusted. The pH-value of the crude tall oil is preferably adjusted before the first purification step, i.e. filter 3 or any other solids separator, but it may also be conducted before the second purification means, i.e. phase separator 5 or any other water separator. Thus adjusting the pH-value of the crude tall oil is carried out before the first purification step 2. Alternatively or additionally adjusting the pH-value is carried out by adjusting pH-value of the solids free crude tall oil between the first purification step 2 and the second purification step 4. The pH-value of the CTO is adjusted to be under 7, preferably under 6, more preferably between 0.5 to 6 and most preferably between 1 to 3 for enhancing the precipitation of lignin, metals and possible other impurities in the CTO effectively. The adjusting of the pH-value of the crude tall oil is normally carried out by lowering the pH-value of the CTO or solids free CTO. Lowering the pH-value of the CTO or solids free CTO may be carried out with acid washing or acidification using sulphuric acid, formic acid, acetic acid or lactic acid. The acid washing may be conducted by the first washer 13 or by the second washer 17, as shown in FIG. 2. The acid washing may be conducted in an acid washing column or vessel in any known washing method. The acid washing column is preferably arranged to provide counter current acid wash. Acidification of the CTO may also be conducted by mixing acid or acidic water to CTO or solids free CTO in a conduit in which the CTO/solids free CTO is conducted or in an acidification vessel or the like. The acid washing or acidification removes metals, alkali metals, phospholipids and other impurities from the CTO/solids free CTO. Temperature of the CTO/solids free CTO during acid washing is between 40 to 120° C., preferably between 50 to 100° C., and more preferably 90° C. During acid washing or acidification the pH-value of the CTO/solids free CTO decreases in response to the used acid and the dosage of the used acid. In summary, adjusting the pH-value of the CTO may be carried out in any location before purification step in which solids are separated from the CTO.

The pH-value of the CTO/solids free CTO is controlled by a pH control unit 30. There are several pH measurement means (not shown in the Figure) in the apparatus that measure the pH of the CTO or solids free CTO. The pH can be measured either from the washers 13 and/or 17 or from the conduits transferring the CTO/solids free CTO. The pH measurement signal 31 from the first washer 13 and/or the pH measurement signal 32 measured from the conduit 16 is transmitted to the control unit 30. Also the pH measurement signal 33 from the second washer 17 and/or the pH measurement signal 34 measured from the conduit 22 is transmitted to the control unit 30. The control unit calculates the amount of acid needed for achieving the suitable pH range and transmits this information to acid controller 25 which controls the amount of acid that is supplied to the process. The acid is added through conduit 35 to one or more of the following parts of the process: to the first washer 13, conduit 16, second washer 17 and conduit 22, depending on the pH value of the corresponding purification step and the purification means used in the step. As can be realized from above, the pH value of the washing water in the washers 13 and/or 17 can be controlled by the control unit 30. Alternatively the pH-value of the CTO/solids free CTO can be carried out independently and separately from the washers 13, 17.

Figure 3:
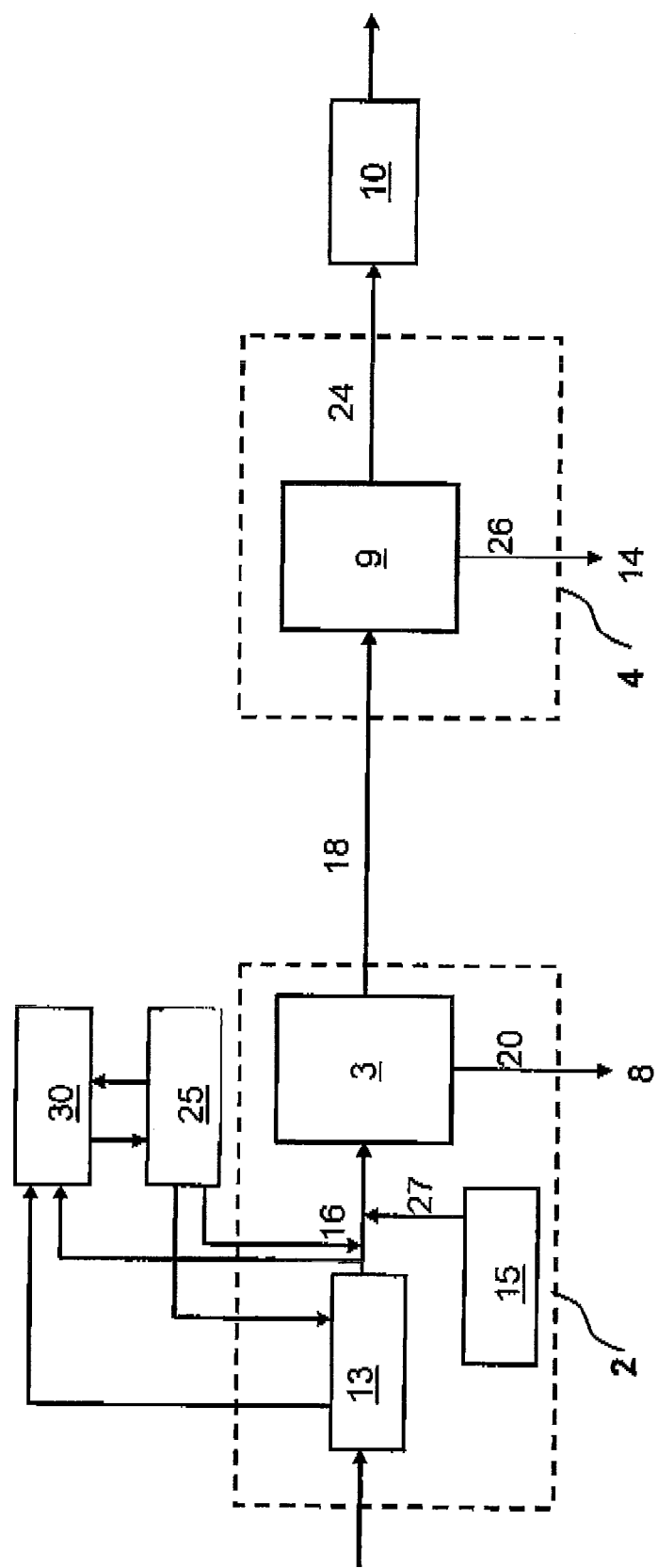

The embodiment shown in FIG. 3 presents the apparatus, where the second purification step 4 comprises a water separator 9 which does not substantially separate solids from the CTO. The water separator 9 separates mainly water 14 which is removed from the separator 9 via conduit 26. As solids are not separated from the solids free CTO in the second purification step, there is no need to adjust the pH-value before the second purification means, i.e. water separator 9. The water separation in the second purification step 4 may be carried out by decantation, centrifugation, liquid coalescing or by any combination thereof. The mentioned methods for separating water from the solids free CTO in the second purification step may be carried out by using one or more water separators 9 for decantation, centrifugation, and liquid coalescing. In the embodiment of FIG. 3, the first purification step 2 is similar to the first purification step 2 of the embodiment shown in FIG. 2.

Thus the first purification step 2 is carried out by filtering the CTO to remove precipitated lignin, metals and other possible solids 8. The filtering is preferably carried out by pressure filtering using one or more pressure filters 3. The filtering may be enhanced by adding filtration aid by filtration aid supply means 15 along conduit 27 to the CTO before the one or more filters 3. From the first purification step 2 the solids free CTO is conducted via conduit 18 to the second purification step 4. The CTO is washed in a first washer 13 before it is fed to the filter 3. The pH of the washing water and/or the pH of the CTO can be controlled by a pH controller 30 in similar way as was explained in connection of FIG. 2.

Figure 4:
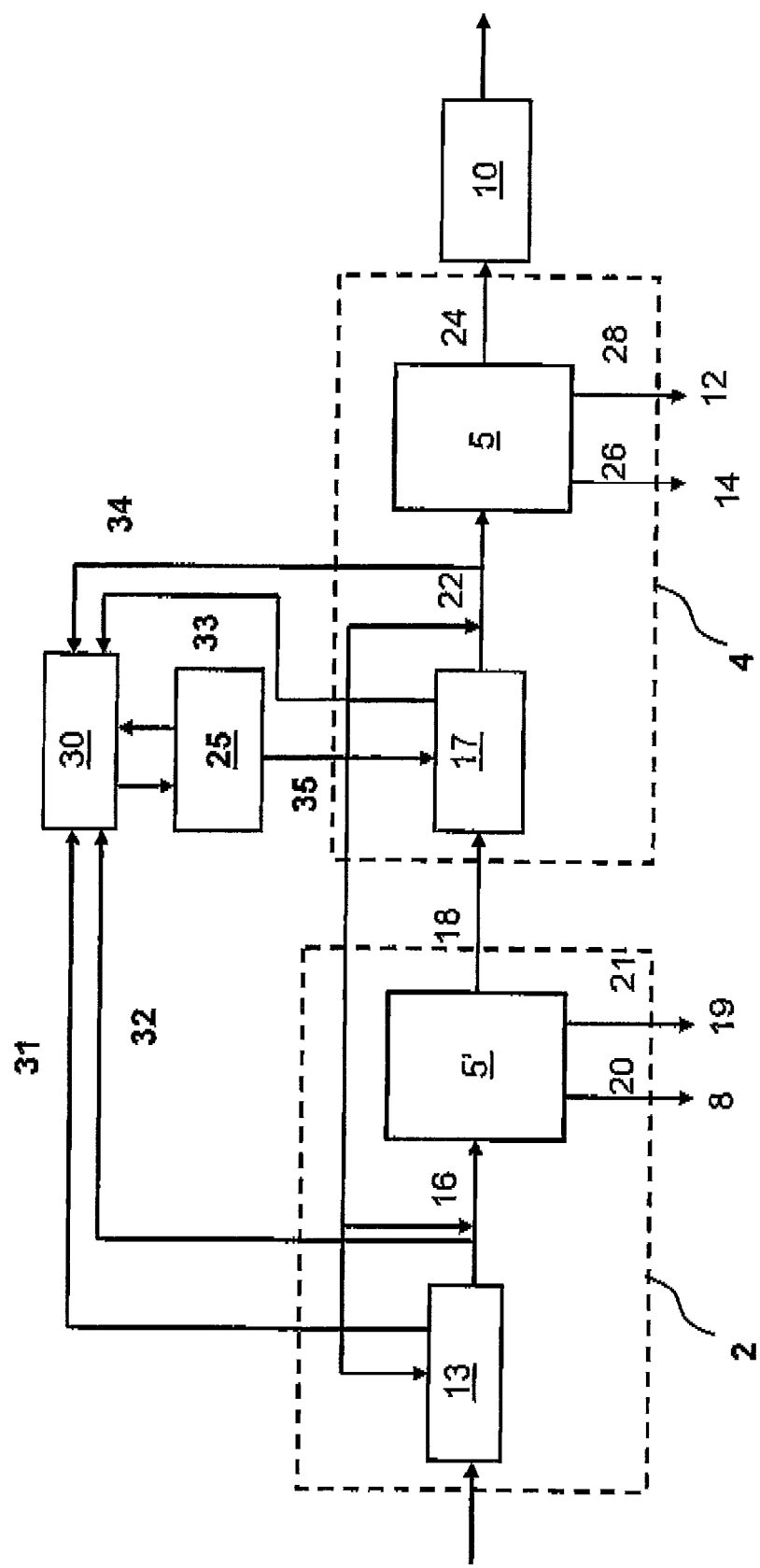

FIG. 4 shows a schematic flow diagram of the purification apparatus according to another embodiment of the present invention. In the embodiment of FIG. 4 both the first purification step 2 and the second purification step 4 are carried out by using at least one phase separator 5', 5. As phase separators, two or three phase separators can be used. The separated water 19 from the separators 5' in the first purification step 2 is removed via conduit 21 and the removed solids 8 are removed via conduit 20. From the second purification step 4, the separated water 14 is removed from the separators 5 through conduit 26 and the removed solids 12 are removed through conduit 28.

Washing CTO and/or the solids free CTO as well as adjusting the pH-value of the CTO/solids free CTO are carried out in the same manner as in the embodiment of FIG. 2.

Figure 5:
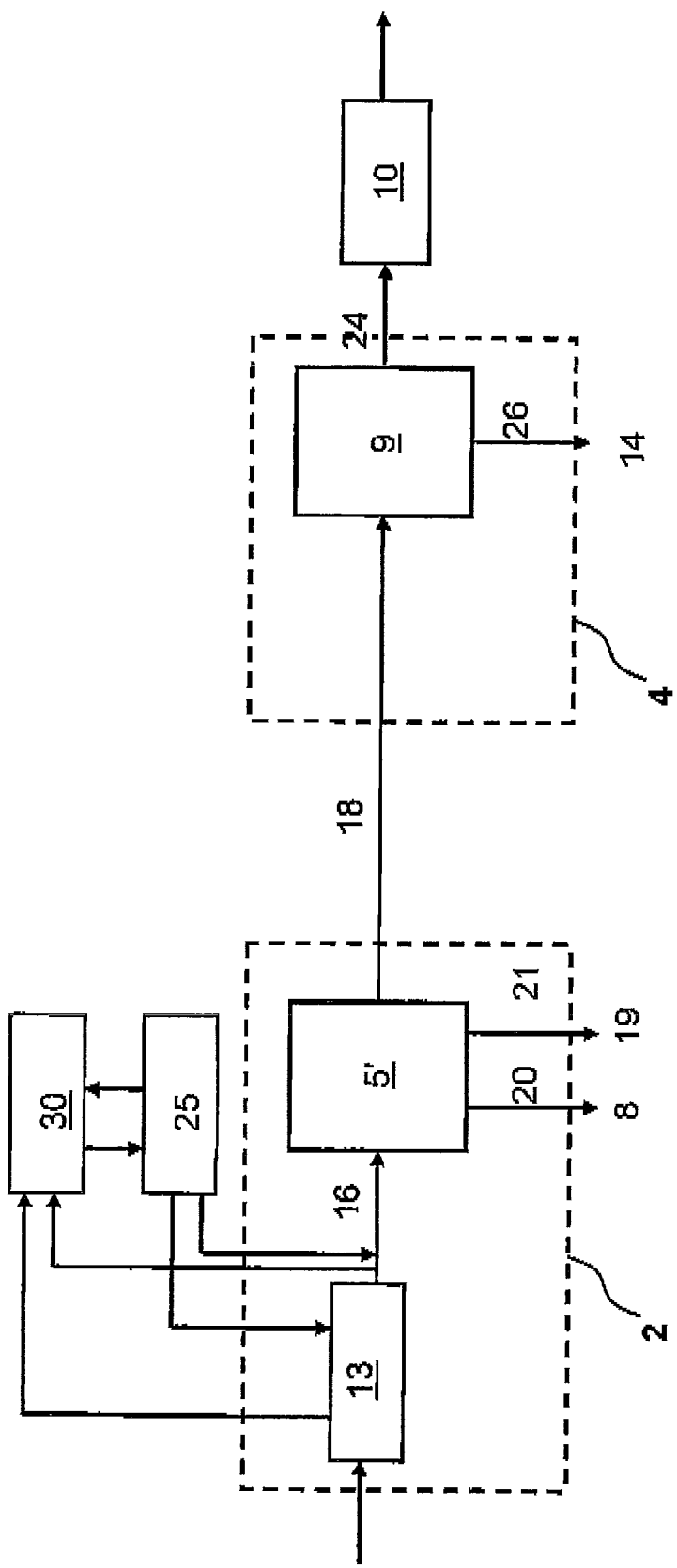

FIG. 5 shows yet another embodiment of the present invention in which the first purification step 2 comprises one or more phase separators 5' and the second purification step 4 comprises one or more water separation equipments 9 that provide water separation by decantation, centrifugation, liquid coalescing or by any combination thereof. Therefore the embodiment of FIG. 5 corresponds the embodiment of FIG. 3, but the filtering 3 is replaced with three phase separation 5'. Thus, in the embodiment of FIG. 5 the first purification step 2 is carried out by using at least one phase separator 5'. As phase separators, two or three phase separators can be used. The separated water 19 from the separators 5' in the first purification step 2 is removed via conduit 21 and the removed solids 8 are removed via conduit 20. Washing the CTO as well as adjusting the pH-value of the CTO are carried out in the same manner as in the embodiment of FIG. 4 or 2.

The purified CTO conducted to storage tank 10 may be then subjected to HDO and/or HI steps carried out in HDO and/or HI sections. If only HDO step is used, the product received from HDO step may further be subjected to isomerisation for producing biofuel. The purified CTO may also be conducted to any other known process for preparing fuel components or other products from the purified CTO.

According to the above mentioned the apparatus and method of the present invention is based on purifying the CTO in two subsequent purification steps and in at least two subsequent purification means. In the first purification step 2 most of the solids are separated from the CTO. The solids separation may be carried out with one or more filters 3 or one or more three phase separators 5', which also separate water from the CTO. After the first purification step 2, the solids free CTO is subjected to a second purification step 4 for essentially separating water from the solids free CTO. The second purification step 4 may be carried out using one or more phase separators 5, which also separate remaining solids from the solids free CTO, for example by decantation, centrifugation, liquid coalescing or by any combination thereof.

It will be obvious to a person skilled in the art that, as the technology advances, the inventive concept can be implemented in various ways. The invention and its embodiments are not limited to the examples described above but may vary within the scope of the claims.

The invention claimed is:

1. A method for purifying crude tall oil, characterized in that the purifying comprises a first purification step (2) for separating at least solids (8) from the crude tall oil, in which first purification step solids (8) are separated from the crude tall oil by filtering, and producing solids free crude tall oil, and after the first purification step (2) a second purification step (4) for separating water (14) from the solids free crude tall oil by phase separation.

2. A method according to claim 1, characterized in that filtering is carried out by pressure filtration.

3. A method according to claim 1 or 2, characterized by adding filtration aid to the crude tall oil before the filtering of the crude tall oil.

4. A method according to claim 3, characterized in that filtration aid is selected from the group consisting of: cellulose, cellulose containing chemical agent, chemical pulp and a combination thereof.

5. A method according to claim 1, characterized in that solids are separated from the crude tall oil in the first purification step (2) by phase separation.

6. A method according to claim 5, characterized in that the phase separation is carried out by a three phase separator or by a two phase separator separating both solids (8) and water (19) from the crude tall oil.

7. A method according to claim 1, characterized in that the phase separation is carried out with a three phase separator or a two phase separator separating both remaining solids (12) and water (14) from the solids free crude tall oil.

8. A method according to claim 1, characterized in that water (14) is separated from the solids free crude tall oil in the second purification step (4) by a phase separation method selected from the group consisting of: decantation, centrifugation, liquid coalescing process and any combination thereof.

9. A method according to claim 1, characterized by adjusting the pH-value of the crude tall oil before separating solids (8, 12) from the crude tall oil.

10. A method according to claim 1, characterized by adjusting the pH-value of the crude tall oil before the first purification step (2) and/or by adjusting the pH-value of the solids free crude tall oil between the first purification step (2) and the second purification step (4).

11. A method according to claim 9 or 10, characterized by adjusting the pH-value of the crude tall oil or solids free crude tall oil between 0.5 to 6.

12. A method according to claim 9 or 10, characterized by adjusting pH-value of the crude tall oil or solids free crude tall oil between 1 to 3.

13. A method according to claim 9 or 10, characterized by lowering the pH-value of the crude tall oil or solids free crude tall oil by acid washing or acidification.

14. A method according to claim 13, characterized in that the acid washing or acidification is performed using sulphuric acid, formic, acetic acid or lactic acid.

15. A method according to claim 9 or 10, characterized by washing the crude tall oil with water before the first purification step (2) and/or by washing the solids free crude tall oil with water between the first purification step (2) and the second purification step (4).

16. A method of use of two step purification of crude tall oil for preparing fuel components from it, in which the two step purification comprises:
  a first purification step (2) by filtering for separating at least solids (8) from the crude tall oil and producing solids-free crude tall oil, and subsequently
  a second purification step (4) for separating water (14) from the solids-free crude tall oil by phase separation.

* * * * *